United States Patent [19]

Tubman

[11] Patent Number: 4,729,444
[45] Date of Patent: Mar. 8, 1988

[54] MOBILE SECURITY APPARATUS

[76] Inventor: Charles Tubman, 5024 SW. 89th Ave., Cooper City, Fla. 33328

[21] Appl. No.: 936,491

[22] Filed: Nov. 28, 1986

[51] Int. Cl.$^4$ .................. B62D 51/04; B62D 11/04; B60P 3/06
[52] U.S. Cl. .................................. 180/9.22; 109/45; 180/6.5; 414/537
[58] Field of Search .................. 180/9.22, 6.2, 6.5, 180/6.7; 109/45, 47, 46, 50; 414/537, 538, 571; 105/29.1; 104/165

[56] References Cited

U.S. PATENT DOCUMENTS

| | | | |
|---|---|---|---|
| 159,380 | 2/1875 | Barnes | 109/45 |
| 268,817 | 12/1882 | Nolan | 109/45 |
| 779,579 | 1/1905 | Brenner et al. | 109/45 |
| 1,390,571 | 9/1921 | Loseky | 109/45 |
| 1,407,969 | 2/1922 | Wickersham | 180/6.5 |
| 2,827,972 | 3/1958 | West | 180/9.1 |
| 3,485,314 | 12/1969 | Herr | 180/19 |
| 3,605,935 | 9/1971 | Gilbert | 180/89 |
| 3,789,941 | 2/1974 | Robertson et al. | 180/9.22 |
| 3,942,598 | 3/1976 | Council | 180/6.5 |
| 4,127,201 | 11/1978 | Baumann | 414/537 |
| 4,167,983 | 9/1979 | Seider et al. | 180/19 R |
| 4,239,477 | 12/1980 | Bach | 414/537 X |
| 4,563,956 | 1/1986 | Wiechert et al. | 105/29.1 |

FOREIGN PATENT DOCUMENTS 2328811 1/1975 Fed. Rep. of Germany .... 109/45 R

Primary Examiner—John A. Pekar
Attorney, Agent, or Firm—Richard M. Saccocio

[57] ABSTRACT

A method for and apparatus for the transfer of valuables from a collection point through an area accessible to the public to an armored vehicle is disclosed. A mobile security containment apparatus comprising a relatively heavy, handleless, and slow speed apparatus is provided. In a preferred embodiment, the directional and turning control movement of the apparatus is provided by a voice-actuated, computer-controlled drive mechanism. The mobile security containment apparatus may be combined with an armored vehicle to provide secured containment of the mobile security containment apparatus while en route to a collection point to a permanent depository such as a bank vault.

12 Claims, 7 Drawing Figures

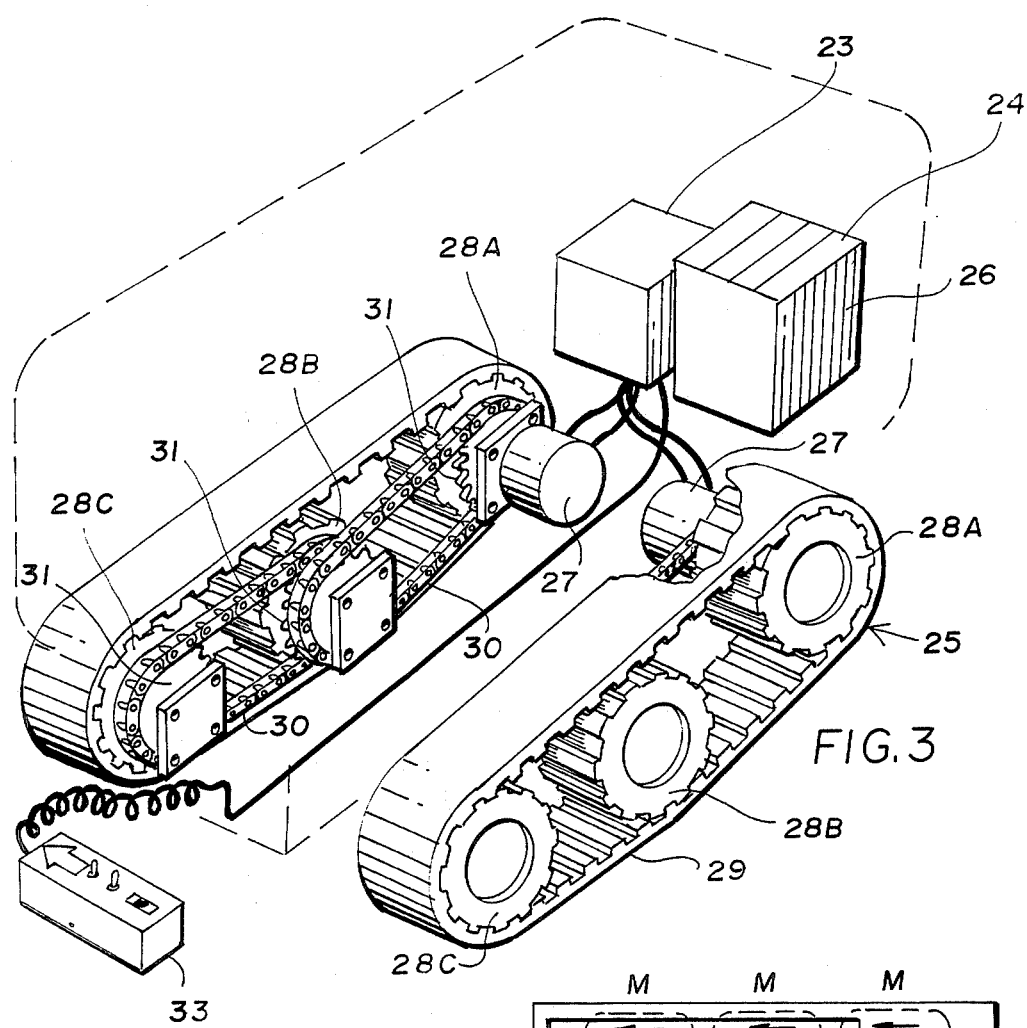
FIG. 3
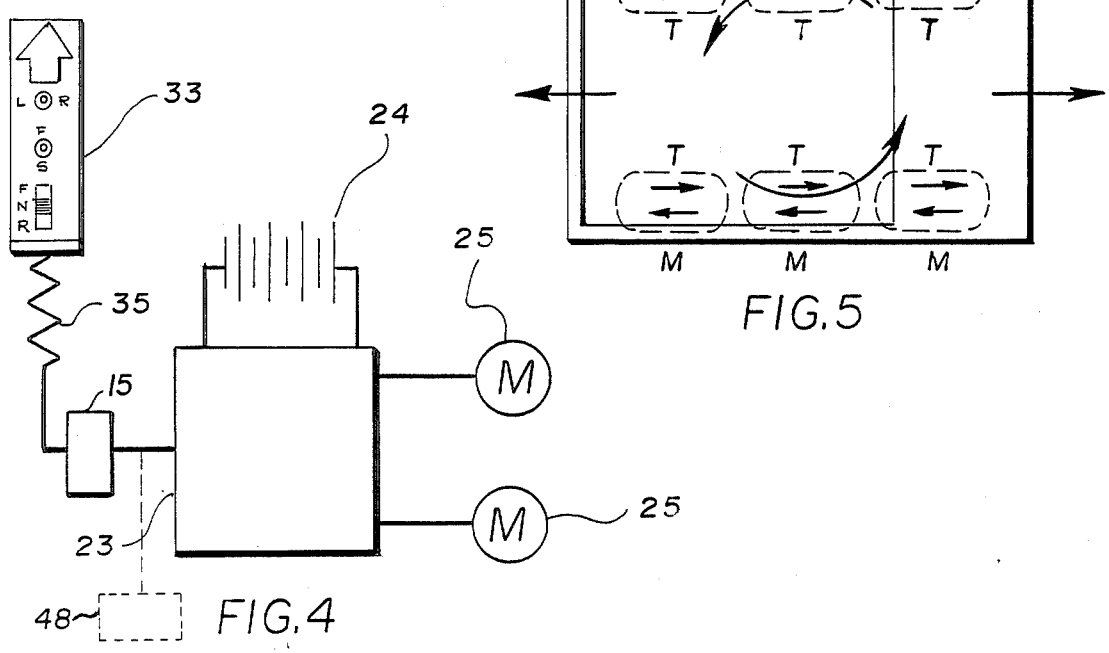
FIG. 5
FIG. 4

MOBILE SECURITY APPARATUS

BACKGROUND OF THE INVENTION

1. Field of the Invention

This invention relates in general to the field of secured depositories for the safe containment of valuables and in particular to the field of mobile apparatus intended to be accompanied by a guard or other security personnel, which apparatus provides for the secured containment of valuables which are to be moved in public areas from one secured depository to another.

2. Description of the Prior Art

Various apparatus and methods have been used in the prior art with a view toward protecting valuables from unauthorized persons. Usually, the apparatus is located in an area which is easily accessible to the public in general. A safe or vault is one such example of the prior art apparatus. such apparatus may be further characterized as being built within a building such as a bank vault or one which is merely contained within an ordinary building such as a common safe. In either characterization, valuables such as money, stock certificates, bond certificates, jewelry, works of art, and other like tangible valuable materials and things are deposited within the apparatus and are secured therein by means of a door which is lockable and openable only by authorized personnel. Such apparatus is usually made very secure so that an unauthorized person would find it most difficult to gain entrance therein; and, in the case of an unattached apparatus, it is made strong and heavy so that an unauthorized individual would find it most difficult to force open and/or move. The main object of such apparatus is, of course, to protect the valuables from being taken by unauthorized persons.

The above-described various characterizations of security containment apparatus are in widespread use in homes, retail establishments, grocery stores, banks, restaurants, stock brokerage establishments, gasoline stations, and even gambling casinos. The list of the establishments where such security apparatus is utilized is, of course, not limited to those mentioned. The reader may readily envision other uses thereof. Of note, is the fact that there are many instances where there exists the desire and need to protect valuables from being stolen. The design of such security containment apparatus is usually in accordance with convenience of use, the prevention of unauthorized access, the ready access by authorized persons and, of course, the degree of security desired. Accordingly, the design of such apparatus ranges between huge bank vaults with doors having thicknesses which measure in feet with elaborate locking mechanisms, to enclosures within a table having a slot for insertion of the valuables and a door lockable by an ordinary lock and key.

Another category of security apparatus for the storage of valuables therein comprises the common and ordinary armored truck. It is well known that such armored trucks allow guards or security personnel to fit within the secured structure which even extends to the cab of the vehicle. This type of security containment apparatus is designed so that it may be driven on the open road and yet be relatively safe from access by unauthorized personnel. The armored vehicle is also designed to be drivable close to an entrance door to many establishments which have previously collected relatively large sums of money or other valuables and it is desired to transfer these valuables via the armored car to a distant bank or savings and loan institution. The armored car then, serves as an intermediate depository for the storage of valuables between a sometimes secured collection point and a secured deposit point.

Armored vehicles have substantially eliminated hand-carried deliveries of cash receipts from a business establishment to a distant bank, which situation is, of course, very susceptible to the theft of cash receipts. Thus, armored vehicles have been shown to be a very effective deterrent against persons trying to illegally obtain valuables while the same are en route to a deposit point. The armored vehicle has been quite successful in that it is not readily prone to being intercepted en route to a depository. One reason is because the size and weight of the vehicle makes it an improbable target for theft of the entire vehicle. Another reason is because the armored nature of the vehicle itself which protects the personnel therein even as against an armed attack from the outside. The armored vehicle can simply drive away in safety from such an attack. This is not to say, however, that an armored vehicle is totally immune to armed theft. It is not. But, its design deters all except a warlike attack using armaments which are not in general readily available.

Notwithstanding the great success and advances in security containment apparatus advanced by the armored vehicle, and the permanent containment safes or vaults within buildings, there still exists a need for additional and improved security containment apparatus. While the valuables may be safe within the security apparatus at the collection point, or while en route within the armored vehicle, or while at the deposit point, there necessarily exists the requirement that the valuables be transferred between each of these points. For example, within a building, valuables are often transferred from small collection points such as cash registers or cash deposit boxes to a larger vault within the store. This transfer entails the opening of the collection depository, removal of the contents, transfer of the valuables to the store vault, opening the store vault and then depositing the valuables therein. When the valuables are being moved from one location to the other within the store and while the store safety deposit receptacles are opened, comprise very vulnerable situations are presented during which theft of the valuables may readily occur. An armed guard during these times is sometimes used to prevent a theft. But, there have been many instances whereby physically overcoming the guard as well as the person conducting the transfer are physically overcome and a theft occurs. Accordingly, an object of the present invention is to provide security containment apparatus which prevents theft or unauthorized access thereto from points of collection to points of deposit and the travel therebetween within individual establishments.

Another object of the present invention somewhat similar to the object stated above is to provide security containment apparatus which is applicable in situations where a number of different establishments are conglomerated within a structure such as a mall and whereby the valuables or deposits from each establishment are collected at the location of each establishment and then transported to a single secured deposit point such as a bank within the mall, or a relatively large vault for further transfer thereafter outside of the mall to a outside bank.

Another object of the present invention comprises the prevention of theft or access by unauthorized personnel during transfer of valuables from a collection point to a deposit point even if the person or persons being used to assist in the transfer are physically overcome by ill-intended persons.

Another obejct of the present invention is to provide apparatus which is capable of providing secured containment of valuables between a collection point comprising a building and a deposit point comprising an armored vehicle wherein the transfer of the valuables must be made in a public area outside of the building.

Another object of the present invention is to provide security containment apparatus which prevents theft of valuables during transfer of the valuables from an armored car to a secured deposit point such as a bank vault.

Another object of the present invention is to provide security containment apparatus which does not need to be opened in an unsecured area or an area which is accessible to the public.

Another object of the present invention is to provide security containment apparatus which deters theft of the security containment apparatus itself.

Another object of the present invention is to provide security containment apparatus for the temporary or intermediate storage of valuables therein, which apparatus is mobile and capable of being driven within establishments, within malls, on outside public walkways, in parking lots, and any other paved or relatively smooth surface.

The above-stated objects as well as other objects which although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention provides a method and apparatus for the secured containment of valuables during transfer and movement between a collection point and a deposit point.

A self-propelled, relatively heavy, compact mobile vault, which is intended to be accompanied by a guard who is not necessarily armed, is provided by the present invention.

In an exemplary embodiment, the mobile apparatus can only travel at a slow rate of speed to prevent a fast getaway in the unlikely event of a theft of the apparatus itself. The shape of the vehicle may be provided with a smooth and rounded external configuration which in combination with a relatively high weight thereof prevents a would-be robber from being able to grasp and lift the apparatus. The size and the turning capabilities of the present invention allow for use of the same within relatively small structures and for small radiused turning. Control of the movement of the apparatus may be accomplished by computer operated voice commands, radio-controlled commands, mechanical apparatus, or electromechanical apparatus.

In a further embodiment of the present invention, the combination of a mobile security containment apparatus and an armored vehicle is provided which allows for the transportation of the mobile vault completely within the armored vehicle for relatively long distances of travel.

Various other objects, advantages and features of the invention will become apparent to those skilled in the art from the following discussion taken in conjunction with the following drawings, in which:

BRIEF DESCRIPTION OF THE DRAWINGS

FIG. 3 is an isometric view of a portion of the mobile security containment apparatus provided by the present invention illustrating one embodiment of the control and drive apparatus thereof;

FIG. 4 illustrates a schematic drawing of the control apparatus of the embodiment of FIG. 3;

FIG. 5 schematically illustrates a method of effectuating turns with the mobile security containment apparatus as provided by the present invention;

DESCRIPTION OF THE PREFERRED EMBODIMENTS

Figure 1:
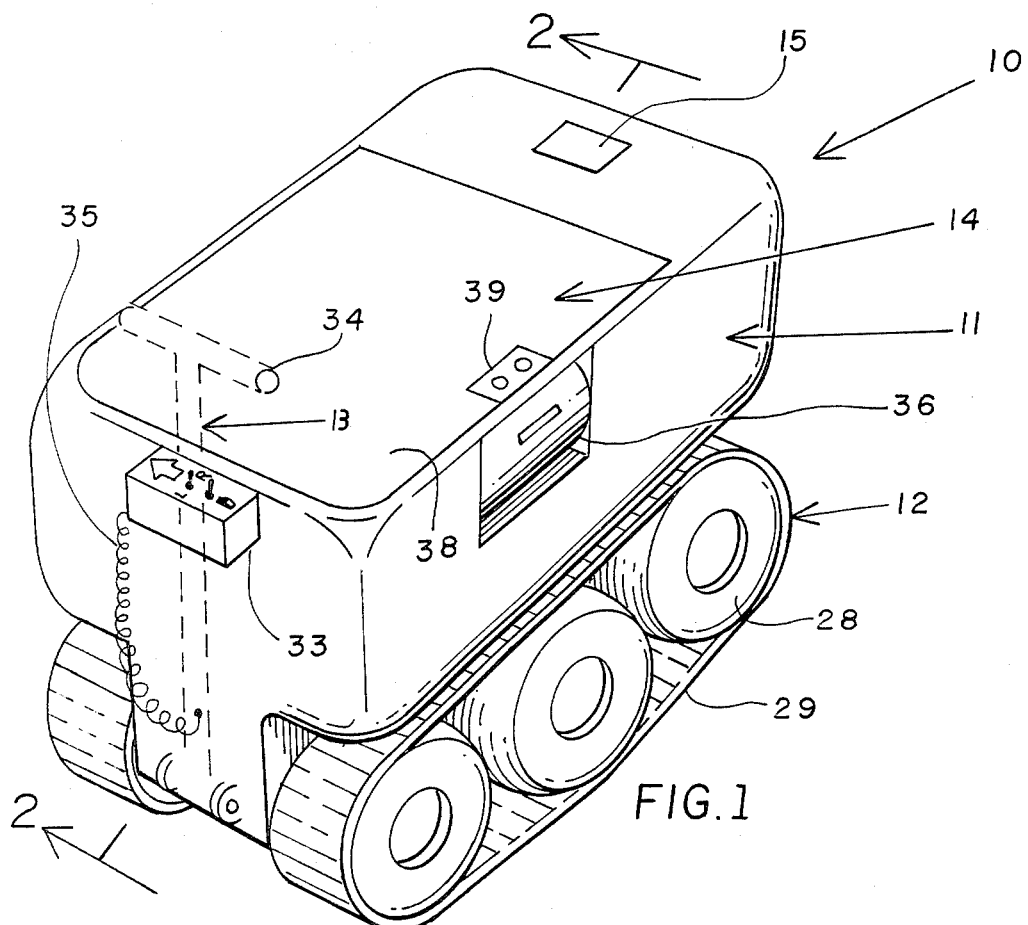
FIG. 1 is an isometric view of one embodiment of the mobile security containment apparatus as provided by the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings wherein like characteristics and features of the present invention shown in the various figures are generally designated by the same reference numerals.

FIG. 1 illustrates an exemplary embodiment of the present invention. The mobile security containment apparatus 10 generally comprises a containment structure 11, propulsion means 12, control means 13, and secured access and retrieval means 14.

Figure 2:
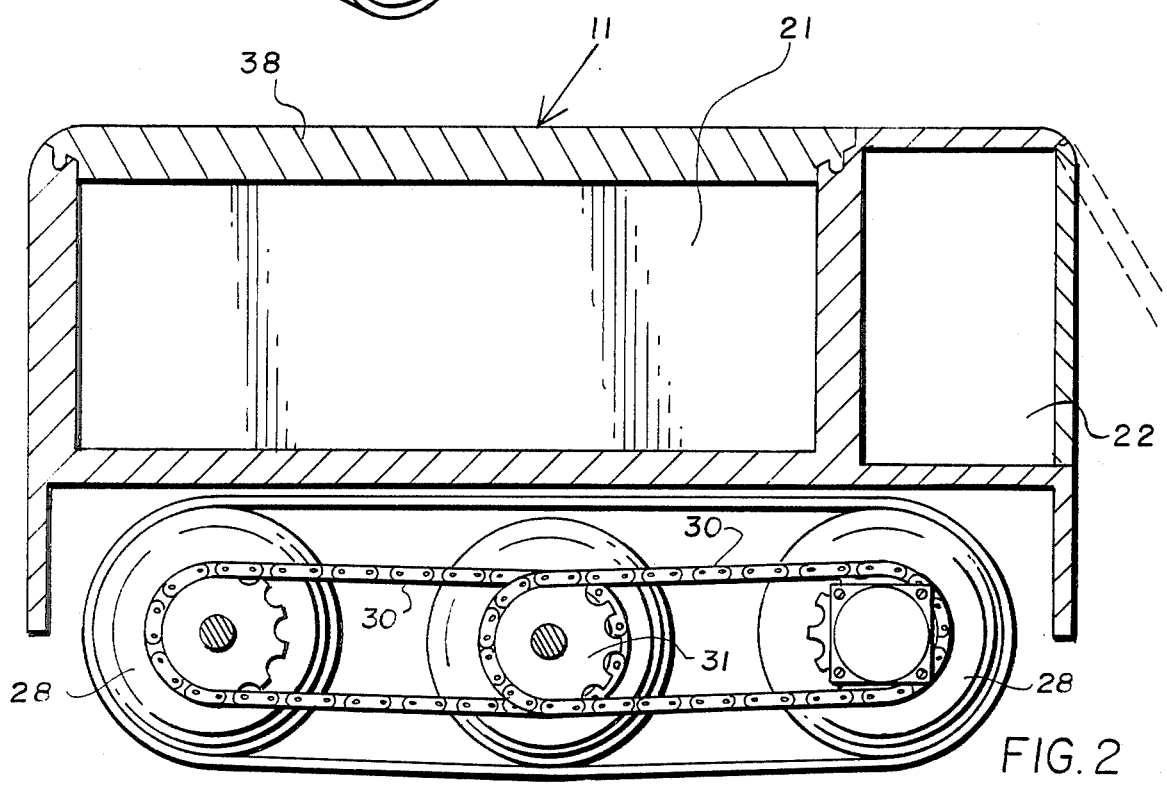
FIG. 2 is a cross-sectional view of the mobile security containment apparatus of FIG. 1 taken through the line 2—2 thereof.

Referring also to FIG. 2 of the drawings, containment means 11 comprises a body which is generally divided into two compartments—a vault compartment 21 and a power and control compartment 22. Both of these compartments are completely encased by the containment structure 11 having walls which comprise the top, side and bottom thereof, which are made from a strong and heavy material such as stainless steel, high-strength plastic or other strong non-magnetic material. The thickness of the walls are to be such so as to prevent ready penetration thereof in order to deny an unauthorized individual or individuals from gaining access to the interior of vault compartment 21. Such thickness also provides, in part, the inventive apparatus with a relatively high weight which may be approximately three-hundred pounds or greater.

The overall size of the mobile security containment apparatus 10 is to be consistent with a number of criteria which are generally concerned with the use to which it is to be used. Accordingly, the size of apparatus 10 is variable provided such sizing follows the teachings of the invention as disclosed herein. For example, it should be able to fit within a conventionally-sized armored vehicle, it should be able to pass through door openings, it should be able to pass between aisle ways, it should be able to maneuver around sharp corners, it should be able to be seen over by a standing person, and last but not least, it should be able to hold a reasonable amount of bulky valuables. Accordingly, the inventive apparatus 10 may be approximately two-to-three feet wide, four-to-six feet long, and three-to-four feet high. The vault compartment 21 of a thusly sized vehicle 10 is, of course, to be consistent therewith and in accordance with the size of the propulsion means 12 and the power control compartment 22.

A mobile security containment apparatus 10, as described above, should provide for approximately seventy five-to-ninety percent of the generally intended uses of the inventive apparatus 10. For uses which fall outside of the generally intended uses, the overall size of the inventive apparatus 10 and the vault compartment 21 may be sized in accordance with any specially-intended uses. For example, where large amounts of bulky valuables, such as bearer bonds, are to be transferred, the height of the vault compartment 21 may be increased to as much as five feet. By varying or increasing only the height, the maneuverability of the inventive apparatus 10 is maintained. But, where maneuverability is not major concern, the length may be increased.

A smaller overall size of the mobile security containment apparatus 10 is also anticipated within the scope of the invention. But, in such circumstances, the relatively high weight of the apparatus must be maintained so that it is substantially impossible to physically pick up the inventive apparatus 10 by manual means. In this manner, as well as with the generally preferred size of the inventive apparatus 10, a great deterrent is provided against stealing of the valuables contained within the inventive apparatus 10 by physically lifting and unauthorizedly appropriating the entire mobile security containment apparatus 10.

Regardless of how great a weight is provided with the inventive apparatus 10, there is always the possibility that a thief will use a mechanical lifting machine such as a fork lift, to attempt to steal the entire mobile security containment apparatus 10. No security containment apparatus is completely theft proof. But, the weight of inventive apparatus 10 provides a substantial deterrent to theft in that physically non-handling is not possible and the use of a mechanical lifting apparatus involves factors which also deter theft. For example, mechanical lifting necessarily involves time, equipment and effort in a public place, which factors each individually comprise deterrents against theft. The time involved would allow for alerting the authorities and give them ample time to arrive on the scene and arrest the person or persons involved in the attempted theft. This time factor provided by the inventive apparatus is believed to be an important element of the present invention. The inconvenience and logistics associated with mechanical lifting apparatus are also considered important deterrents against theft.

The overall shape of the inventive apparatus 10 comprises a smooth external surface with well-rounded corners which may somewhat be equated to that of the interior of a bathtub. A smooth external shape with rounded corners, as most clearly shown in FIG. 1 of the drawings, presents no edges or corners which would allow a would-be robber to physically grasp the apparatus 10 and lift the same during a theft thereof. Even a moderately heavy overall weight of the order of one hundred pounds or more would render the inventive apparatus 10 impossible to lift by one or even two people because of the rounded external configuration. Thus, the external configuration of the inventive apparatus 10 provides a deterrent against the theft of the entire mobile security containment apparatus 10 by manual means. By making the containment structure 11 from a material such as non-magnetic stainless steel or other non-magnetic material, the magnetic attachment of lifting handles by unauthorized personnel is also precluded. A greater weight, such as three hundred pounds or more, assures that the inventive apparatus 10 cannot be physically stolen by even more persons. The small and compact but yet heavy size of the inventive apparatus 10 precludes physical appropriation thereof because at least four persons would be necessary to act in combination to lift the inventive apparatus 10. Even so, a combination of the small, compact and heavy containment apparatus 10 and the four persons involved, would render movement most inconvenient and virtually preclude movement through a normal-sized door or even into a normal-sized "getaway" truck. Accordingly, the present invention 10 comprises unique apparatus which is usable in public places so as to effectuate its intended purpose and yet not withstanding its "availability" it is virtually impossible to be stolen by physically lifting and appropriating the same.

The control and power compartment 22 of the inventive apparatus 10 may be located at either end of the inventive apparatus 10. The physical size of the same may be consistent with the drive means 12 and the control means 13 utilized. Furthermore, it is not necessarily required that the walls surrounding the control and drive compartment be as thick as the walls surrounding the vault compartment 21. The control means 13 may provide for its own security.

Drive means 12 comprises a power source 24 and traction apparatus 25 appropriately arranged and coupled together. Power source 24 may comprise a plurality of storage batteries 26 in combination with the electric DC motors 27. Power source 24 may in the alternative comprise gas propulsion means such as a gasoline or propane internal combustion engine. Power source 24 may also comprise a hydraulically-powered system. Power source 24 transfers motion to traction means 25 which may, for example, comprise rubber-tired wheels 28 or a continuous traction belt 29. Traction belt 29 is preferably made from a material such as synthetic rubber so as not to mar the surface upon which it travels as well as not provide rigidity so as to enable unauthorized personnel to grasp the same and thereby lift the inventive apparatus 10. In either design, as alternatively shown in FIG. 3, the power supply 24 is operationally connected to DC motors 27 which drive a first set of wheels or cogs 28A. Wheels or cogs 28B and 28C are connected to wheels or cogs 28A by chain belts 30 through sprockets 31. Additionally, sprockets 32 provide for movement of the inventive apparatus up a ramp 43 on an armored vehicle 42 (see FIGS. 6 and 7) by engaging with cutouts in rails 46 attached to ramp 43. An alternative method of moving inventive apparatus 10 involves the use of power supply 24 being used to drive a blower to create an air cushion under the inventive apparatus 10. Appropriately arranged vents provide for forward, reverse and turning movements.

In order to provide the mobile security containment apparatus 10 with maneuverability, the drive and turning arrangement as shown in FIG. 5 may be utilized. During straight ahead movement, the traction means 25 on both sides of the containment apparatus 10 move in the same direction as indicated by arrows "M". Such direction "M" may be either forward or backward. To turn or pivot the containment apparatus 10, each side of the traction means 25 may move in a direction opposite to each other as shown by the arrows "T" in FIG. 5. The direction of arrows "T" may be either forward or backward depending upon the direction of turning desired. In the alternative, one side of traction means 25 may be held stationary while the other side is moved in a desired direction so as to attain the desired turn. Still another variation comprises turning of either or both of the front and back wheels 28A or 28C in either direction so as to achieve a desired direction of turning. In any of the alternative embodiments, adequate maneuverability of the mobile security containment apparatus 10 is provided.

In a preferred embodiment drive means 12 provides movement to the containment apparatus 10 with a travel speed substantially equivalent to that of a person walking at a moderate pace, that is, approximately four miles per hour. Higher travel speeds are undesirable. The slow travel speed of the mobile security containment means 10 comprises yet another deterrent to the unauthorized appropriation of the valuables contained therein and of the apparatus 10 itself. Should an unauthorized person or persons obtain access to the control means 13 and the drive means 12, the relatively slow speed of the containment 10 prevents a fast "getaway" which would give the appropriate authorities sufficient time to arrive on the scene and apprehend the would-be robbers.

Control means 13 may comprise a control box 33 or a control handle 34, either of which may be used to impart the appropriate direction of travel or turning to the inventive apparatus 10. As shown in FIG. 4, control box 33 is operationally connected to the electronic control means 23 which in turn is operationally connected to power supply 24 and traction means 25. Control box 33 may be attached to electronic control means 23 by an elastically coiled electrical cord 35. In this manner the person controlling the movement of inventive apparatus 10 may hold the control box 33 in his hands while directing the motion of apparatus 10. Appropriate buttons and/or switches on control box 33 may provide for forward, reverse and turning motions. Handle 34 may provide for similar directional control of apparatus 10.

In order to prevent an unauthorized person from directing the movement of inventive apparatus 10, control box 33 may be provided with a security lock switch 15 which is necessary to activate the buttons and switches on control box 33 or handle 34. Such a security lock switch 15 may, for example, be a computer controlled voice command switch which activates control box 33 or handle 34 by voice commands of only authorized personnel; or, it may be an electronic combination lock switch. Lock switch 15, as shown in FIG. 4, may be series connected between electronic control means 23 and control box 33.

In another embodiment, control means 13 comprises voice-actuated computer control means. Since the operation of and, therefore, the commands to be given to the inventive containment apparatus 10 are relatively few in number and comprise fast, slow, forward, back, straight, left, right, start and stop, a relatively uncomplicated computer may be used. In this manner, the computer control means 13 may be set to allow motion to be imparted to the containment apparatus 10 by only authorized persons. The computer control means 13 would not recognize the voice of would-be robbers and, therefore, would prevent them from controlling the operation of the inventive containment apparatus 10. The voice activated computer control means may comprise a computer 48 which is operationally connected to control box 32 as shown in phantom in FIG. 4. In this embodiment control box 33 and control switch 15 would not be used.

In yet another embodiment, control means 13 may be activated by a radio controller which is operated by a person within an armored car which is being used in conjunction with the inventive apparatus 10.

The access and retrieval means 14 is used to allow valuables to be deposited within the vault compartment 21 and to be retrieved from within the vault compartment 21. In a preferred embodiment access retrieval means 14 may comprise an access door 38 located in the top of the vault compartment 21. Door 38, as shown in FIG. 1, may be larger so as to allow large items to be placed within vault compartment 21. Door 38 may utilize inside invisible hinges in combination with a locking mechanism 39 to prevent unauthorized access. Locking mechanism 39 may comprise a double lock which requires an activating mechanism in order to allow the use of a key or a combination to open door 38. The activating mechanism may comprise a double key arrangement, a voice activated computer, or an electronically-operated punch code.

In another preferred embodiment, an access means 36 may comprises an opening which is similar to the opening for a night depository of a bank. Thus, once an object or valuable is placed within the vault compartment 21 through a night depository type of opening, retrieval of the valuable is prevented. Furthermore, no key or other device is required to allow the valuable to be placed therein. The night depository type of opening apparatus 36 may be located on either side of the containment apparatus 10 as shown in FIG. 1 of the drawings. Retrieval may be accomplished through door 38.

The access and retrieval means 14 of the inventive containment apparatus 10 also provides a deterrent to the unauthorized taking of the valuables contained within the inventive containment apparatus 10. Since neither the access means 36 nor door 38 allows for easy and/or fast opening in order to gain access to the vault compartment 21, any unauthorized attempt to gain access to the valuables must involve a substantial amount of time. This time would allow the appropriate authorities to arrive on the scene and arrest the would-be robbers.

Figure 6:
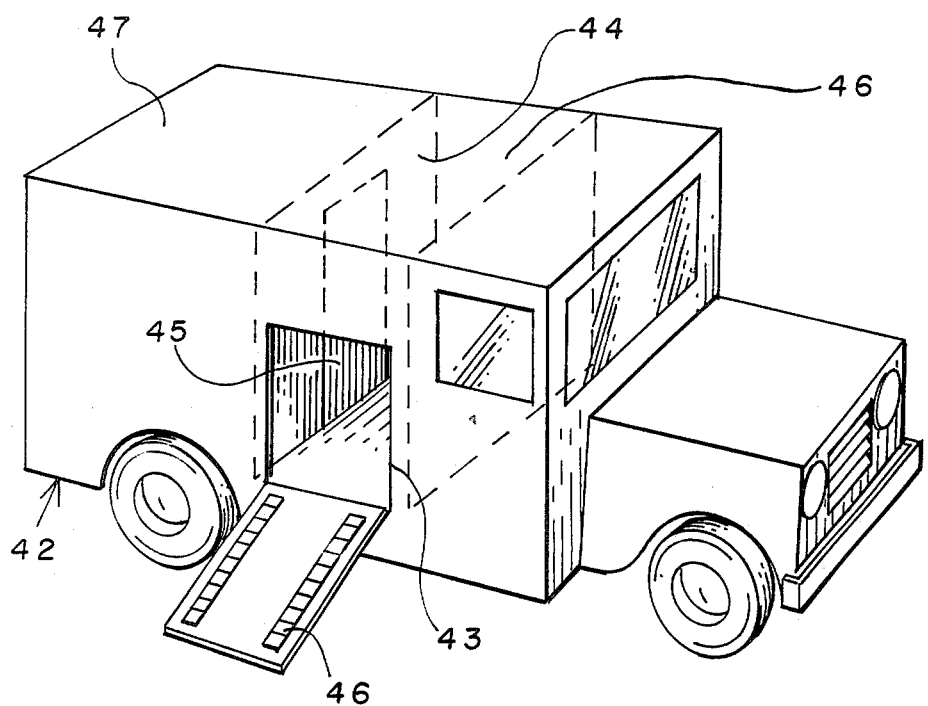
FIG. 6 schematically illustrates the use of the mobile security containment apparatus as provided by the present invention in conjunction with a modified version of an armored vehicle; and, FIG. 7 illustrates the drive means used to propel the mobile security containment apparatus up an incline comprising a ramp connected to the armored vehicle of FIG. 6.
Figure 7:
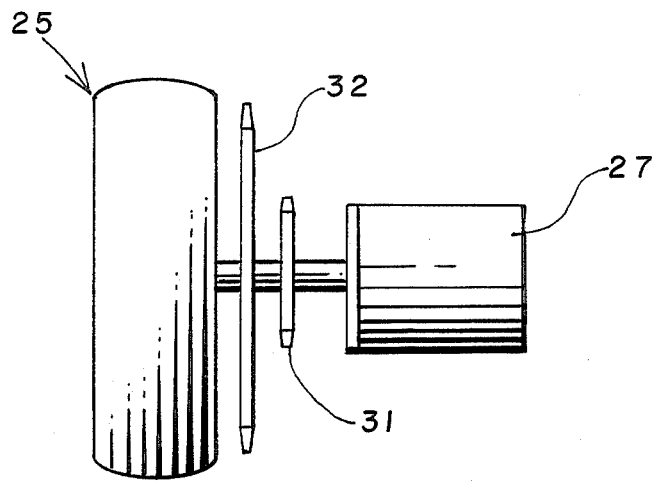

FIG. 6 illustrates, in schematic fashion, the use of the mobile security containment apparatus 10 in combination with an armored vehicle. Armored vehicle 42 may comprise a standard well-known armored vehicle but modified as disclosed herein. A motor-operated door 43 may pivot downward to provide a ramp for the mobile security containment apparatus 10. The inventive containment apparatus 10 may then be driven up the ramp 43 and into the inside of the armored vehicle 42. Thereafter, ramp 43 may be closed and locked from within vehicle 42. A wall 44 containing a separate door 45 is provided transverse to and within armored vehicle 42 so as to form two compartments within armored vehicle 42. One compartment 46 being that of the security containment apparatus 10, and the other 47 being the storage containment within the armored vehicle 42. In this manner, once the inventive containment apparatus 10 is secured within the armored vehicle 42, door 45 may be opened and the contents of the mobile security containment apparatus 10 may be transferred to within compartment 47 in a totally secured environment. Thereafter, door 45 may be closed, which permits the mobile security containment apparatus 10 to be again used to pick up valuables at a collection point. A reverse procedure provides for the valuables to be removed from armored vehicle 42 and into a deposit point.

In accordance with the above, a mobile security containment apparatus and method are provided which allows the secured transfer of valuables from a collection point to an armored vehicle and then to a deposit point. Such transfer in the past has been the weakest link in the chain of security in effectuating the transfer of valuables from, for example, a retain establishment to a permanent facility such as a bank vault. The disclosed inventive apparatus and method virtually eliminates the unauthorized appropriation of valuables and does so without the need for the person effectuating the transfer to be armed.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. Security containment apparatus comprising in combination:
   containment means for the storage of valuables therein;
   secured access and retrieval means for allowing the placement of valuables in said containment means and for allowing the removal of said valuables from said containment means by authorized personnel;
   propulsion means for propelling said security containment apparatus;
   control means for controlling the propulsion of said security containment apparatus by authorized personnel who are located external of said security containment apparatus; and,
   means for preventing theft of said security containment apparatus.

2. The security apparatus of claim 1, wherein said control means includes secured on-off means for activating or deactivating said control means by said authorized personnel.

3. The security apparatus of claim 1, wherein said propulsion means comprises in combination an energy source, means for converting energy from said energy source into mechanical motion, driving wheels attached to said security apparatus, and means for coupling said mechanical motion means to said driving wheels.

4. The security apparatus of claim 3, including endless tracks attached to said driving wheels on either side of said security apparatus.

5. The security apparatus of claim 3, wherein said propulsion means further comprises one or more driven sprockets mechanically coupled to said mechanical motion means and one or more rails having openings therealong for engagement with said one or more sprockets, said one ore more rails being positioned on a roadway along which said security containment apparatus travels, whereby traction between said roadway and said security apparatus is achieved by said engagement of the sprocket and the openings in the rails.

6. The apparatus of claim 1, wherein said means for preventing theft of said security containment apparatus comprises the weight of said security containment apparatus being of a weight of three hundred or more pounds.

7. The apparatus of claim 1, wherein said means for preventing theft of said security containment apparatus comprises said security apparatus having a weight of three hundred or more pounds and a height of five feet or less.

8. The apparatus of claim 1, wherein said means for preventing theft of said security containment apparatus comprises said containment means having an external shape with rounded corners and edges whereby a person is unable to grasp said containment means to manually lift said containment apparatus.

9. The apparatus of claim 1, wherein said means to prevent theft of said security containment apparatus comprises said propulsion means being arranged to propel said security containment apparatus at the approximate speed of a person walking at a moderate pace or less.

10. The security apparatus of claim 9, wherein said propulsion means propels said security apparatus in forward, backward and turning motions.

11. The security apparatus of claim 1, wherein said means for preventing theft of said apparatus comprises in combination the shape of said containment means and the height, weight and propulsion speed of said security containment apparatus.

12. Mobile self-propelled security containment apparatus including an armored vehicle for housing said security containment apparatus, a ramp for on-loading and off-loading said security containment apparatus into and out of said armored vehicle, and a secured door between said secured space and the secured interior of said armored vehicle whereby valuables may be securely removed from said security containment apparatus and placed within the secured interior of said armored vehicle, said security containment apparatus comprising:
   containment means for the storage of valuables therein;
   secured access and retrieval means for allowing the placement of valuables in said containment means and for allowing the removal of said valuables from said containment means by authorized personnel;
   propulsion means for propelling said security containment apparatus;
   control means for controlling the propulsion of said security containment apparatus by authorized personnel who are located external of said security containment apparatus; and,
   means for preventing theft of said security containment apparatus.

* * * * *